United States Patent
Wu

(10) Patent No.: US 7,848,396 B1
(45) Date of Patent: Dec. 7, 2010

(54) METHODS, ALGORITHMS, SOFTWARE, CIRCUITS, RECEIVERS, AND SYSTEMS FOR INCREASING BANDWIDTH AND/OR RECORDING DENSITY IN DATA COMMUNICATION AND DATA STORAGE SYSTEMS

(75) Inventor: Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 1234 days.

(21) Appl. No.: 11/067,347

(22) Filed: Feb. 25, 2005

Related U.S. Application Data

(60) Provisional application No. 60/553,015, filed on Mar. 12, 2004.

(51) Int. Cl.
    *H04B 1/38* (2006.01)
(52) U.S. Cl. .................. 375/220; 375/263; 375/296; 375/229
(58) Field of Classification Search ............. 375/220, 375/263, 296, 229; 360/49, 40, 43, 72.2; 369/59; 714/69
See application file for complete search history.

(56) References Cited

U.S. PATENT DOCUMENTS

| | | | | |
|---|---|---|---|---|
| 4,752,841 A | * | 6/1988 | Syracuse et al. | 360/49 |
| 5,267,096 A | * | 11/1993 | Buchan et al. | 360/41 |
| 5,557,481 A | * | 9/1996 | Huang | 360/41 |

(Continued)

OTHER PUBLICATIONS

L. R. Bahl, J. Cocke, F. Jelinek, J. Raviv; Optimal Decoding of Linear Codes for Minimizing Symbol Error Rate; IEEE Transactions on Information Theory; Mar 1974; pp. 284-287, vol. 20 , Issue 2.

Claude Berrou, Alain Glavieux and Punya Thitimajshima; Near Shannon Limit Error-Correcting Coding and Decoding : Turbo-Codes (1); IEEE International Conference on Communications, 1993, (ICC 93) Geneva, Technical Program, Conference Record; May 23-26, 1993; pp. 1064-1070; vol. 2.

John G. Proakis; Digital Communications, 4th Edition; 2001; pp. 580-582; McGraw-Hill; New York, New York.

*Primary Examiner*—Shuwang Liu
*Assistant Examiner*—Helene Tayong

(57) ABSTRACT

Methods, circuits, and systems for increasing bandwidth and/or transition separation in data communications and data storage in the presence of potential intersymbol interference (ISI). The method includes writing L bits of serial data per data transition period to a channel, reading data units from the channel M times per data transition period ($M \leq L$), and determining a most likely value for a $K*2^{(L-M)}$-bit binary sequence of the data. The circuit generally receives m-ary symbols, converts them to n-ary data, and includes detector logic that (i) calculates a most likely n-ary data sequence from L-unit blocks thereof, and (ii) disallows subsequent L-unit blocks in which there is a transition and any of the first x units do not equal any of the last y units in an immediately preceding block (where x+y=L). Generally, successive transitions in the serial data are at least L/M bit lengths apart. The algorithm(s) and software generally implement the method, and the receivers and systems generally include the circuit. By using certain coding techniques and increasing the transmitter/write clock frequency, bandwidth and/or minimum transition separation in run length limited (RLL) encoded data can be increased dramatically.

49 Claims, 10 Drawing Sheets

U.S. PATENT DOCUMENTS

| | | | | |
|---|---|---|---|---|
| 5,638,226 A | * | 6/1997 | Koren | 360/40 |
| 5,696,790 A | * | 12/1997 | Graham et al. | 375/238 |
| 5,754,593 A | * | 5/1998 | Koren | 375/263 |
| 5,889,823 A | * | 3/1999 | Agazzi et al. | 375/341 |
| 6,009,549 A | * | 12/1999 | Bliss et al. | 714/769 |
| 6,028,728 A | * | 2/2000 | Reed | 360/51 |
| 6,055,117 A | * | 4/2000 | Hansen et al. | 360/45 |
| 6,473,252 B1 | * | 10/2002 | Graham | 360/40 |
| 6,597,526 B1 | * | 7/2003 | Gray | 360/40 |
| 7,480,110 B2 | * | 1/2009 | Brittenham | 360/65 |

* cited by examiner

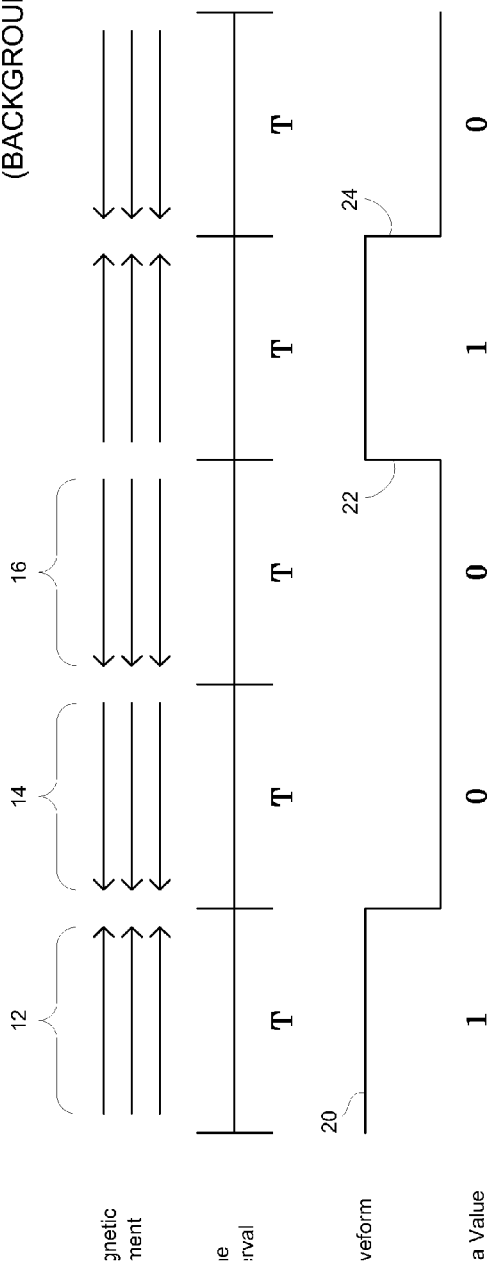
FIG. 1 (BACKGROUND)
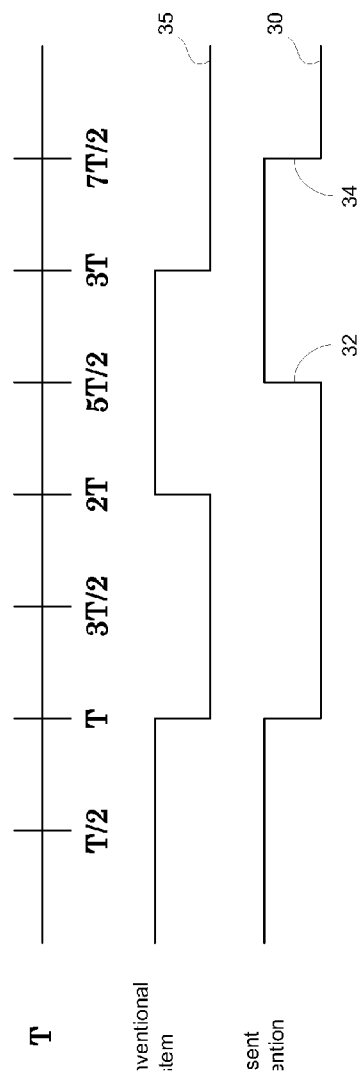
FIG. 2

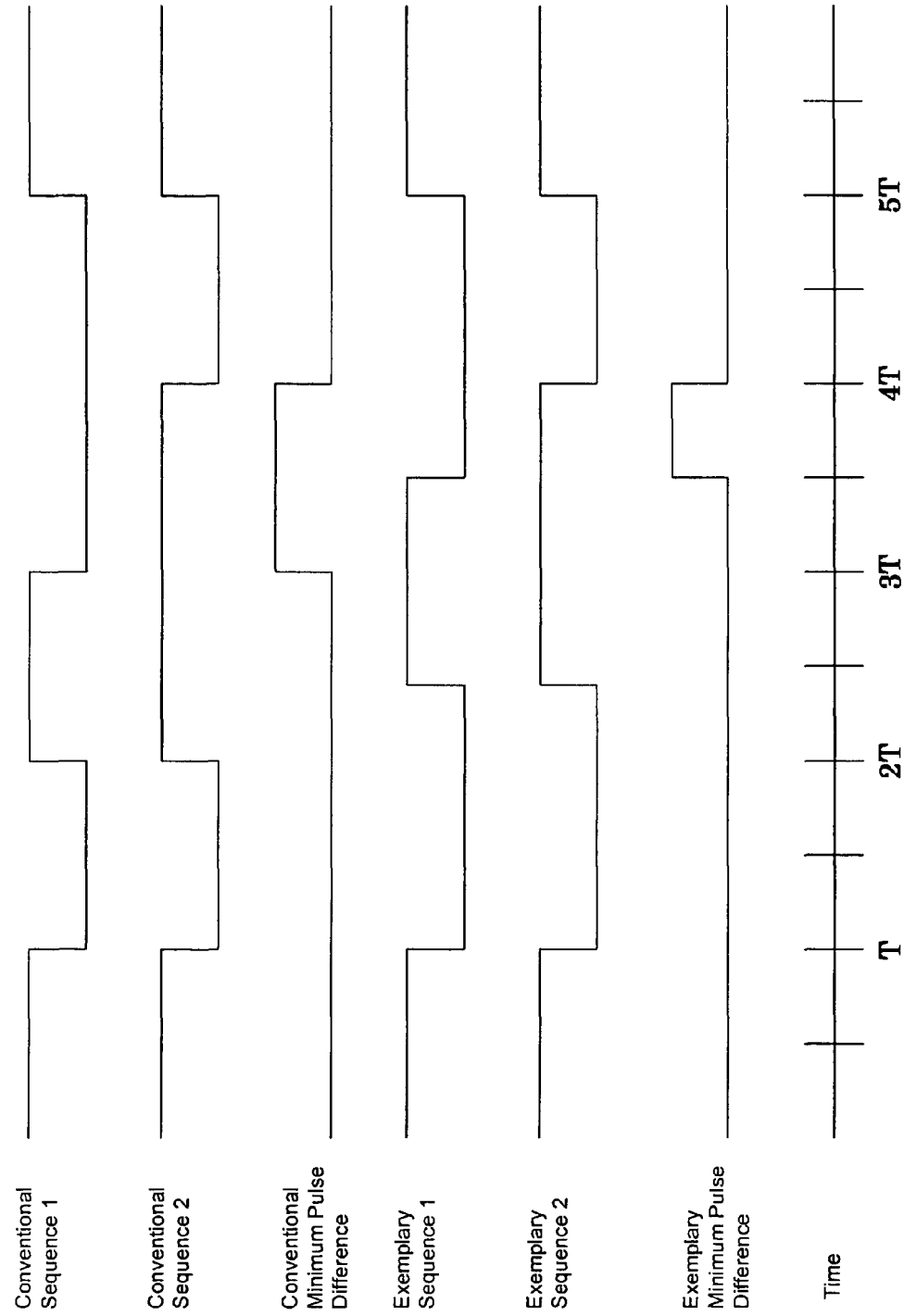

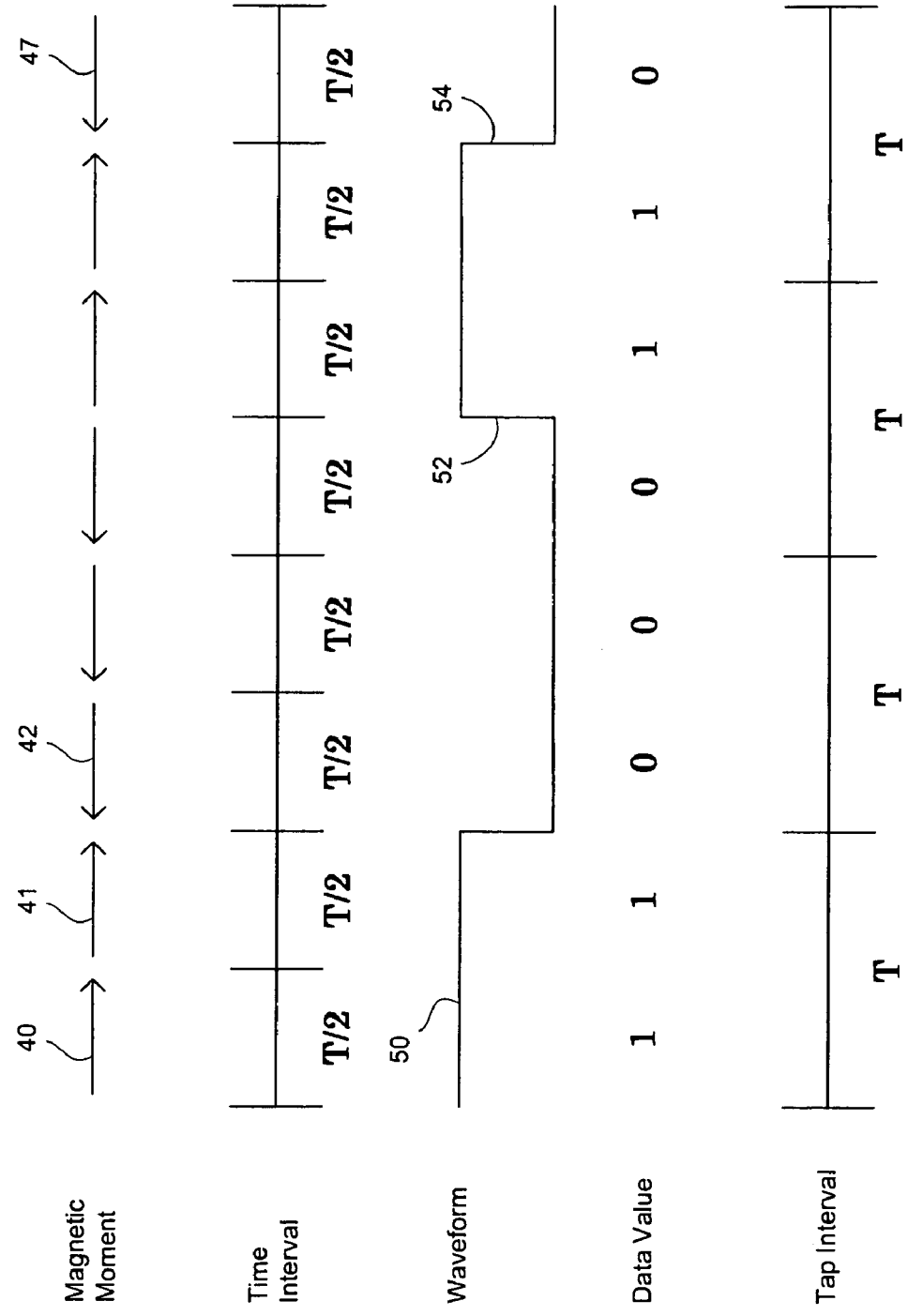

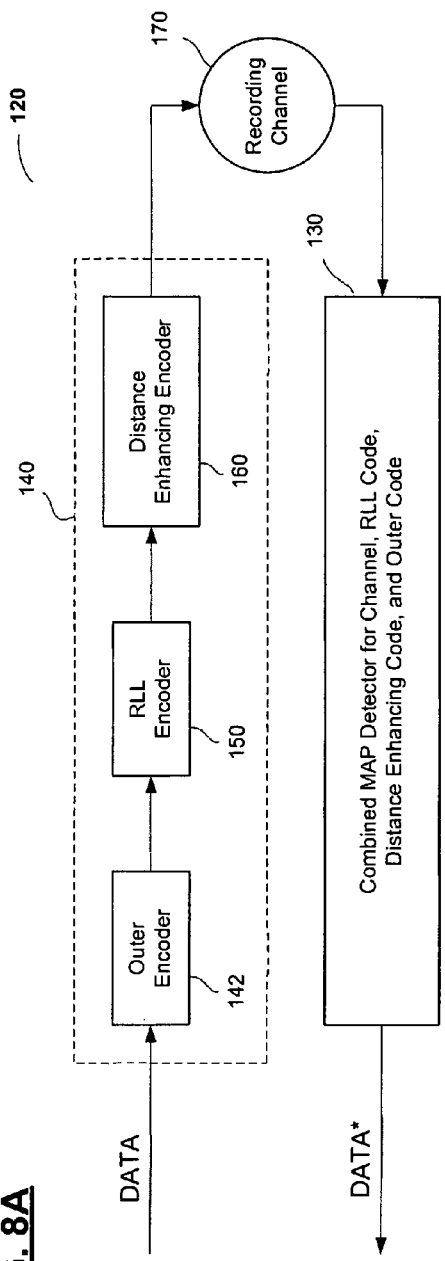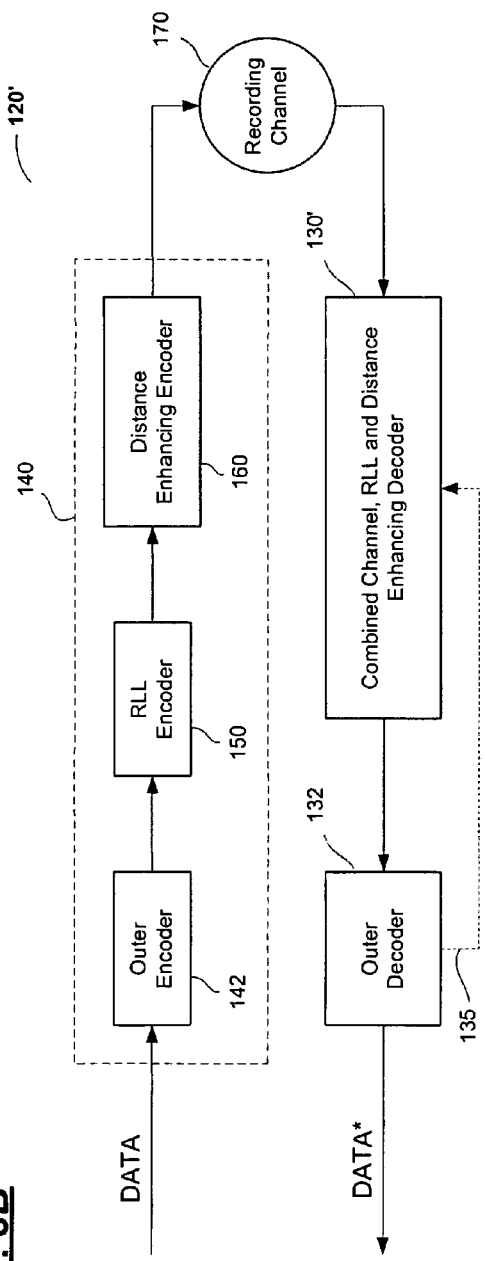
FIG. 8A
FIG. 8B

METHODS, ALGORITHMS, SOFTWARE, CIRCUITS, RECEIVERS, AND SYSTEMS FOR INCREASING BANDWIDTH AND/OR RECORDING DENSITY IN DATA COMMUNICATION AND DATA STORAGE SYSTEMS

RELATED APPLICATIONS

This application claims the benefit of U.S. Provisional Application No. 60/553,015, filed Mar. 12, 2004, incorporated herein by reference in its entirety.

FIELD OF THE INVENTION

The present invention generally relates to the field of data communications and data storage in the presence of potential intersymbol interference (ISI). More specifically, embodiments of the present invention pertain to methods, algorithms, software, circuits, receivers, and systems for increasing bandwidth and/or recording density in storage channels using run length limited (RLL) codes.

DISCUSSION OF THE BACKGROUND

One important parameter for defining efficiency in data transmission systems is bandwidth, measured as bits transmitted per second. For data storage channels (e.g., magnetic media such as hard disk drives, audiotape, videotape, etc., or optical media such as optical disks or CD-ROMs, etc.), efficiency is measured by data density in terms of number of bits recorded per T, where T is a fixed spatial interval. The higher the density or bandwidth, the more efficient the data storage or communication system.

Current data storage systems write and read data generally at a fixed rate of 1 bit per unit time T to and from the recording medium. The data is recorded as a binary physical feature on the medium (e.g., direction of magnetization for magnetic recording, reflection on/off [or above/below a certain threshold] for optical storage). The unit time T is related to the spatial measure of how close the minimum separation can be for data transitions on the recording medium, which is limited by the physical characteristics of the medium.

FIG. 1 is a diagram showing data recording density concepts. In a magnetic recording medium such as a hard disk drive (not shown), the magnetic moment for a bit of data may be oriented in a one of two opposite directions of magnetization (e.g., in a first direction for data bit 12, in the opposite direction for data bits 14 and 16). The write head generally records data (e.g., bits 12, 14 and 16) at time intervals of one bit per time period T. The read head outputs a waveform 20 corresponding to the magnetically recorded data. Due to physical limitations in the medium (e.g., maximum recording density and/or minimum dimensions in the medium for recording a bit of information, etc.), the medium may be read at maximum rate of one data bit per time period T. The unit time T corresponds to the data transition interval, because data transitions such as 0→1 transition 22 and 1→0 transition 24 must be separated by a length of time of at least T.

The data transition interval T represents a fundamental limit to the rate or speed at which data may be read and/or transmitted from magnetic recording media. In present-day commercial magnetic recording media (e.g., hard disk drives), data transitions cannot occur closer together than the time interval T, due to limits in the magnetics of the media. For example, under certain conditions, if binary data are read and/or transmitted from magnetic recording media at rates faster than 1/T (i.e., transitions are closer than T units of time apart), higher nonlinear distortion and partial erasure may result, leading to the disappearance of one or more data transitions which may be too close to a previous or subsequent transition.

Data storage systems (hard disk drives, audiotape, videotape, etc., or optical media such as optical disks or CD-ROMs, etc.) generally involve a write head and a read head, respectively acting as a transmitter and receiver for the data. There is a relative movement between the write head or read head and the recording media during write/read operations. These operations are usually achieved by fixing the head position, and moving (e.g., spinning) the medium. For a given velocity v between the head and the medium, the minimum time interval T between data transitions is determined by minimum temporal transition constant $T_t$ for the medium:

$$T = T_t / v \qquad (1)$$

Therefore, for a given velocity v between the head and the medium, maximizing the recording density is equivalent to maximizing the data write/read rate (in units of bits/second). For conventional hard disk drives, the only apparent way to increase the physical density on the storage medium is to decrease T. Demands for increasing the recording density of magnetic recording media continue nonetheless, and the need for reading magnetically recorded information at rates faster than the current fundamental limit(s) of magnetic recording media has been long felt.

SUMMARY OF THE INVENTION

Embodiments of the present invention relate to methods, algorithms, software, circuitry, receivers, and systems for increasing bandwidth and/or transition separation in data communications and/or data storage in the presence of potential intersymbol interference and/or involving RLL codes. The method generally comprises the steps of (a) writing serial data to a storage or communication channel at a rate of L bits per data transition period; (b) reading each of K successive units of recorded data from the storage or communication channel M times per data transition period; and (c) determining a most likely value for the $K*2^{(L-M)}$-bit binary sequence corresponding to the K recorded data units. Generally, L is an integer of at least 2, K and M are each independently an integer of at least 1, M is less than or equal to L, successive transitions in the serial data are not closer than L bit lengths apart, and each of the K units contains L bits of the recorded data. The algorithm(s) and software essentially implement the present method.

The circuit generally comprises (1) circuitry configured to receive a serial stream of m-ary symbols, (2) logic configured to convert the m-ary symbols to corresponding n-ary data, and (3) detector logic configured to (i) calculate a most likely sequence for the n-ary data from L-unit blocks thereof, and (ii) disallow subsequent L-unit blocks in which (A) there is a transition within the L unit block and (B) any of the first x units of the subsequent L-unit block do not equal any of the last y units in an immediately preceding L-unit block, where x and y are each an integer of at least 1 and x+y=L. Generally, m is an integer of at least 2 (and in one embodiment, at least 4), and $2 \leq n \leq m$. Consistent with the above-described method, L is an integer of at least 2, and successive transitions in the n-ary data are not closer than L units apart. The receivers and/or systems generally comprise those that include a circuit embodying one or more of the inventive concepts disclosed herein.

The present invention advantageously provides a relatively simple technique for increasing bandwidth and/or minimum transition separation in data communications involving intersymbol interference (ISI), largely using existing technology, and with small or minimal changes to existing circuitry. By using certain coding techniques and increasing the transmitter (e.g., write) clock frequency, bandwidth and/or minimum transition separation in ISI channels can be increased dramatically. The invention is particularly applicable to retrieval of information from storage channels (particularly magnetic disk drives) that use a RLL code.

These and other advantages of the present invention will become readily apparent from the detailed description of preferred embodiments below.

BRIEF DESCRIPTION OF THE DRAWINGS

FIG. 1 is a diagram showing conventional data transition interval (or period) concepts.

FIG. 2 compares exemplary waveforms from the present invention and a conventional system.

FIG. 3 compares minimum pulse differences for exemplary waveforms from the present invention and a conventional system.

FIG. 5 is a diagram useful for explaining the present method.

FIGS. 8A-E are diagrams showing exemplary systems according to the present invention.

DETAILED DESCRIPTION OF THE PREFERRED EMBODIMENTS

Figure 4A:
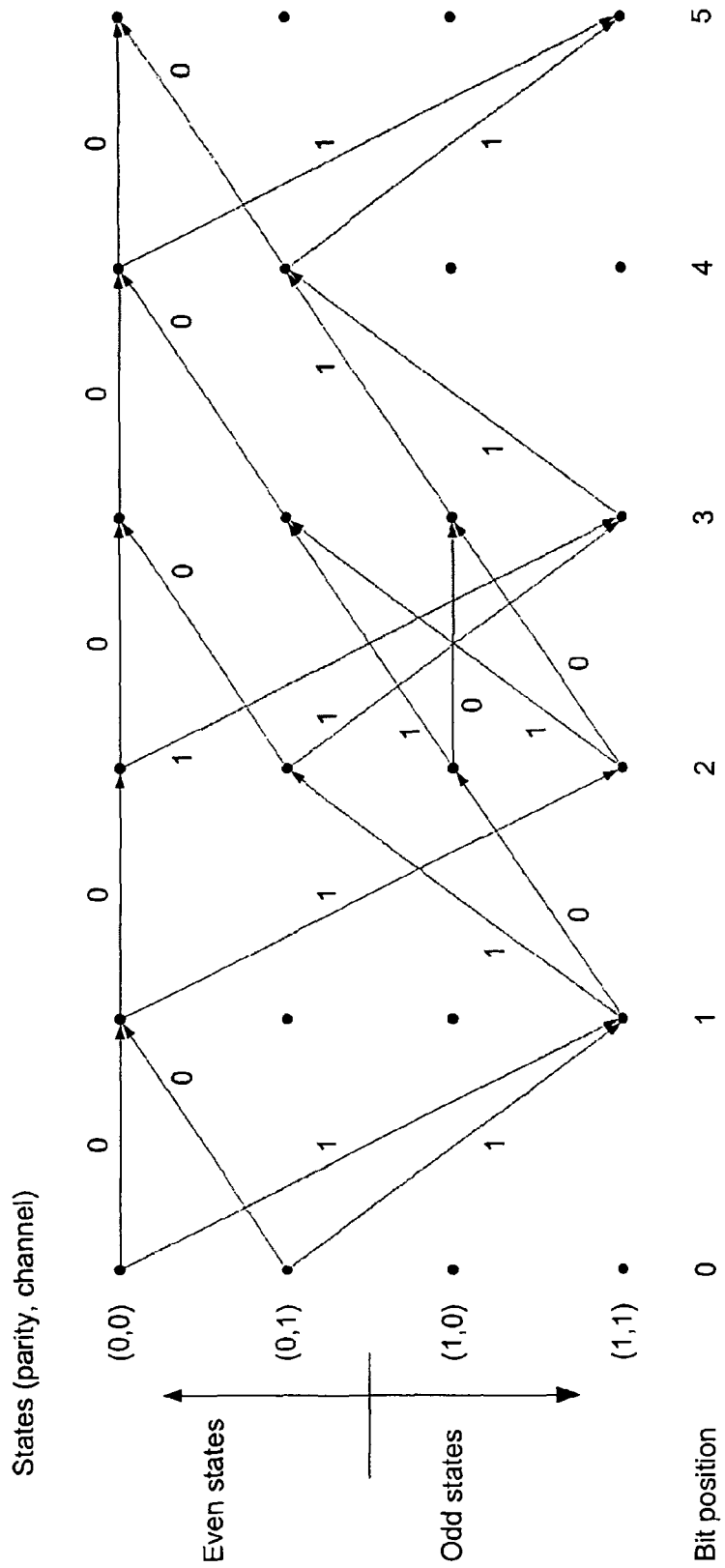
FIGS. 4A-B are trellis diagrams for an exemplary detector according to the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period," "interval" and "frequency" are generally used interchangeably herein, but are generally given their art-recognized meanings. In addition, in the context of data bits and data symbols, the term "unit" generally refers to either a data bit or a data symbol, as those terms are understood in the art. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present invention concerns a method, algorithm, software, circuit, receiver, and system (e.g., a binary storage system) for processing serial data, particularly through an ISI channel, with increased recording density and without requiring a decrease in T. The method generally comprises (a) receiving K units of serial data at an effective rate of L bits per data transition period; (b) determining an input L-bit value for each of the K serial data units once per data transition period; and (c) determining a most likely value for a K*L-bit binary sequence corresponding to the K serial data units. Generally, each of the serial data units represents L binary data bits, L is an integer of at least 2, and K is an integer of at least 1. The algorithm and/or software are generally configured to implement the present method and/or any process or sequence of steps embodying the inventive concepts described herein.

A further aspect of the invention concerns a circuit, generally comprising (1) circuitry configured to receive a serial stream of m-ary symbols, (2) logic configured to convert the m-ary symbols to corresponding n-ary data, and (3) detector logic configured to (i) calculate a most likely sequence for the n-ary data from L-unit blocks thereof, and (ii) disallow subsequent L-unit blocks in which (A) there is a transition within the L unit block and (B) any of the first x units of the subsequent L-unit block do not equal any of the last y units in an immediately preceding L-unit block, where x and y are each an integer of at least 1 and x+y=L. Generally, m is an integer of at least 2 (or, in one embodiment, at least 4), and $2 \leq n \leq m$. Consistent with the above-described method, L is an integer of at least 2, and successive transitions in the n-ary data are not closer than L units apart. The receiver and system generally comprise the present circuit and/or any circuit embodying the inventive concepts described herein.

One important aspect of the invention includes writing at higher rate than 1/T, generally at rate of (L/M)*(1/T), where L and M are integers and $L \geq M$, but reading at a rate of about 1/T. This key feature enables increased recording density without a corresponding decrease in T. The invention, in its various aspects, will be explained in greater detail below with regard to exemplary embodiments.

Exemplary Methods

The present invention relates to a method of transmitting serial data through a channel, generally comprising the steps of (a) writing the serial data to the channel at a rate of L bits per data transition period; (b) reading each of K data units from the channel M times per data transition period; and (c) determining a most likely value for a $K*2^{(L-M)}$-bit binary sequence corresponding to the K data units. Generally, L is an integer of at least 2, K and M are each independently an integer of at least 1, M is less than or equal to L, successive transitions in the serial data are at least L bit lengths apart, and each of the K units contains L bits of data. The present method is advantageous for recording data on or transmitting data through ISI channels, particularly when retrieving magnetically recorded data from a data storage system.

The method is applicable to essentially any data communications system involving ISI channel(s) and noise, such as storage networks, magnetic and optical data storage systems, local, metropolitan and wide area telephone networks using wireline and/or fiber optic communication channels, Ethernet and/or token-ring networks, television and radio transmissions, satellite transmissions, etc. Thus, in the general context of the present invention, "writing" also means transmitting, and "reading" also means receiving. However, when used in the specific context of storage systems and networks, the terms "writing" and "reading" generally have their art-recognized meanings.

In a further embodiment, the data receiving step may comprise receiving K serial data units sequentially (i.e., serially). Also, the step of determining the most likely value may comprise Viterbi detecting (i.e., applying a Viterbi algorithm, in hardware or software, to) the K*L-bit binary sequence. When data units are received sequentially, the (K−1)th L-bit unit is received in the preceding data transition period, the (K−2)th L-bit unit is received two data transition periods prior, the (K−i)th L-bit unit is received i data transition periods prior, the (K+1)th L-bit unit is received in the next data transition period, the (K+2)th L-bit unit is received two data transition periods later, the (K+i)th L-bit unit is received i data transition periods later, etc. Typically, the data unit is a symbol having a sufficient number of states to represent L (or more) bits of binary data. Thus, a data unit "contains" L bits of data when it has a sufficient number of states to represent L or more bits of binary data.

In specific implementations, the serial data (channel code) may be coded, preferably according to a run length-limited (RLL) code, and the data may be interleaved (e.g., the method may further comprise interleaving the serial data prior to transmitting it into the channel). Thus, the RLL code may comprise a conventional (d,k) code or a (d,G/I) code (where the latter term refers to an interleaved (d,k) code). in the context of the present invention, a (d,k) code refers to a code that requires d+1 consecutive bits having the same state (e.g., zero or one) before a transition can occur, but that contains at most k consecutive bits having the same state. Typically, $0 \leq d \leq 3$ (more typically d=1), $3 \leq k \leq 21$ (more typically $5 \leq k \leq 11$; in certain embodiments, k=7 or 9), and d<k (more typically d<k+2, k+3 or k+4). As will be explained below, in preferred embodiments, $d+1 \geq L$, a constraint that is particularly suitable in certain embodiments (e.g., data storage in magnetic media) for NRZ or NRZI encoding.

Another group of commonly used RLL codes include interleaves, and have constraints like (0, G/I). Interleaved RLL codes generally have (d,k) constraint(s) with d=0, and k=G. A (0, G/I) code is one in which transitions may be spaced one or more data bit lengths apart (i.e., where d=0, each successive bit of data may change state), and the data may contain no more than G+1 successive bits having the same state. Such bits may be referred to herein as "same state bits." In addition, for each interleave in a (0, G/I) code (e.g., all odd-index bits, or all even-index bits), the maximum number of 1's or 0's between transitions are I.

Thus, the present method may further comprise (i) channel encoding and/or NRZ or NRZI encoding the serial data prior to transmitting or writing the serial data to the channel, and/or (ii) receiving a (K+1)th unit of the serial data at the effective rate, and repeating the binary value determining and "most likely value" determining steps. As is known in the art, channel encoding refers to the process of encoding the serial data so that it meets certain constraints applicable to or associated with a certain channel type (e.g., d and k in conventional (d,k) code), carries error correction code (e.g., cyclic redundancy code) or parity information, etc.

When the encoded data comprises a run-length limited code, another important aspect of the invention involves a minimum separation between transitions of at least L/M bits (e.g., encoding the data such that the minimum separation between transitions is at least L/M bits). When binary RLL codes are used, the minimum run of either 1's or 0's can only be an integer number. The binary RLL codes are usually specified by the (d,k) constraint(s), which mean that minimum number of bits between transitions (i.e., 0→1 or 1→0) must be at least d+1, and maximum number of same bits between transitions is no more than k. With a (d,k) code, $d+1 \geq ceil(L/M)$, where ceil(L/M) denotes the smallest integer that is greater than or equal to L/M.

Writing at a rate of (L/M)*(1/T), preferably in combination with (d,k) encoding such that $d+1 \geq ceil(L/M)$, the present invention enables writing at a higher density than conventional 1/T systems, without requiring smaller minimum transition separation. To see this, suppose the RLL code rate is r (where $r \leq 1$); i.e., to ensure conformance with the (d,k) constraint(s), each coded bit effectively conveys r information bits. The storage density, as characterized by bits per T, is then r*ceil(L/M). As a result, as long as r>1/ceil(L/M), the storage density is greater than 1 bit/T.

FIG. 2 shows compares an exemplary waveform 30 of the present invention to an exemplary waveform 35 of a conventional system, where L=2, M=1, and the RLL code imposes a (1,∞) constraint. Such RLL constraints can be achieved by a code with rate >0.69. Therefore, the new system records at least 0.69*2=1.38 bits/T, which represents a 38% increase of density. From the plot of the waveforms 30-40, it is obvious that the minimum transition spacing of the new system is still T (e.g., note the minimum spacing between transitions 32 and 34), but transitions may happen at T/2 boundaries, instead of T boundaries (e.g., note the timing of transitions 32 and 34). The added flexibility of transition boundaries provides an intuitive explanation why the present invention enables increasing recording density without decreasing the minimum transition spacing T.

Thus, in theory, the present invention poses two difficulties for sequence detection. First, since the fundamental write (transmission) rate is (L/M)*(1/T), the optimal read channel detector (receiver) should also operate at the same increased rate. Second, the minimum pulse difference between two valid sequences in the present invention is only (M/L)*T, instead of T, which can be a problem because M can be less than L, but T is the fundamental, minimum transition spacing for the recording medium. This minimum pulse difference is depicted in FIG. 3.

The difference between conventional sequences 1 and 2 occurs between times 3T and 4T. Because conventional sequences 1 and 2 comprise waveforms written at a rate of 1 bit/T, the minimum pulse length of a conventional coding system processing such sequences is T. However, the difference between exemplary sequences 1 and 2 occurs between times (7/2)T and 4T. Because exemplary sequences 1 and 2 comprise waveforms written at a rate of 2 bits/T, the minimum pulse length of a coding system processing such sequences is T/2. This decrease in the minimum pulse difference will decrease the noise margin when one pulse sequence is distinguished from the other, which means that the latter system may be more prone to detection errors.

The first problem related to the read channel detector (receiver) operating rate can be solved by using a multi-level detector for binary inputs. In one respect, one may consider the system as transmitting information at intervals of T (units of time), but instead of transmitting binary signals, symbols carrying L/M bits of information per interval are transmitted. For the example where L=2 and M=1, the system may transmit one of four possible binary sequences per interval: 00, 01, 10, or 11. Of course, not all of the four patterns can be transmitted at any given interval, as any transmitted sequence has to meet the coding constraint(s). For example, if a RLL code is used, and a d=1 constraint is imposed on the written sequence, an interval with a 10 pattern can only be followed by an interval with a 00 or 01 pattern, but not a 11 or 10 pattern. At the receiving end, the read-back signal may be sampled at rate of 1 bit/T, instead of 2 bits/T. A radix-4 Viterbi detector can be constructed with four branches exiting and entering each state, instead of 2 branches (as is the case for binary data processed at a rate of one bit per interval). The coding restrictions in the sequence patterns means that the trellis for a Viterbi detector can be trimmed (i.e., some branches are not allowed), leading to reduced complexity in the Viterbi detector (at least as compared to an optimal radix-4 detector).

Thus, in one implementation, each of the serial data units may comprise a symbol having a number of possible states sufficient to represent all allowed L-bit binary sequences of the serial data. The symbol does not need to be capable of representing all theoretically possible states, only those that are allowed (see, e.g., the T/5 example in paragraph [0056] below). In the latter implementation, the step of determining the binary value may comprise decoding the symbols.

Sampling at rate higher than 1/T may require an increased analog bandwidth, as well as a faster A/D converter. Neither implementation is particularly desirable from a design and/or manufacturing point of view. By keeping the sampling rate at 1/T, and shifting the detection complexity to the digital logic/circuitry (e.g., the Viterbi detector), one can achieve a cost-effective detector design.

Of course, one can also sample at any rate greater than 1/T, but not more than (L/M)*(1/T), and increase both the complexity of the analog and the digital logic/circuitry to achieve an optimal performance/complexity tradeoff. For example, if L=3, M=1, one can either sample at 1/T and use a radix-8 Viterbi detector, or sample at 2/T, and use a radix-4 detector. In either case, the Viterbi detector trellis can be trimmed to reflect RLL constraints.

The second problem (the minimum pulse difference being less than T) can be solved by adding a layer of distance-enhancing code. A simple example (and the preferred embodiment) uses a single parity check code. For every N bits to be written to the medium, one more bit is added to make the final N+1 bits satisfy an even parity check. These N+1 bits are then written to the medium. When the data are received, the Viterbi detector incorporates this single parity bit structure into the trellis by doubling the number of states in the detector trellis; half of the states correspond to a even running parity, while the other half correspond to an odd running parity. At the beginning and the end of each block of N+1 bits, the running parities need to be matched (either both even or both odd; note that even parity is satisfied as long as the ending running parity matches the beginning running parity, e.g., they can be both odd). This trellis will therefore force the detected bit sequence to satisfy the even parity constraint for each block of N+1 bits. As a result, a single bit error cannot occur at the output of a Viterbi detector having such a parity constraint.

For example, in FIG. 3, if exemplary sequence 1 is written on the medium, the Viterbi detector will not output exemplary sequence 2, because exemplary sequence 2 would violate the even parity check. Therefore, the minimum pulse difference in such a system is generally 2*(M/L)*T, which represents a 100% increase over the minimum pulse difference for an uncoded system (e.g., the minimum pulse difference shown in FIG. 3).

Figure 4B:
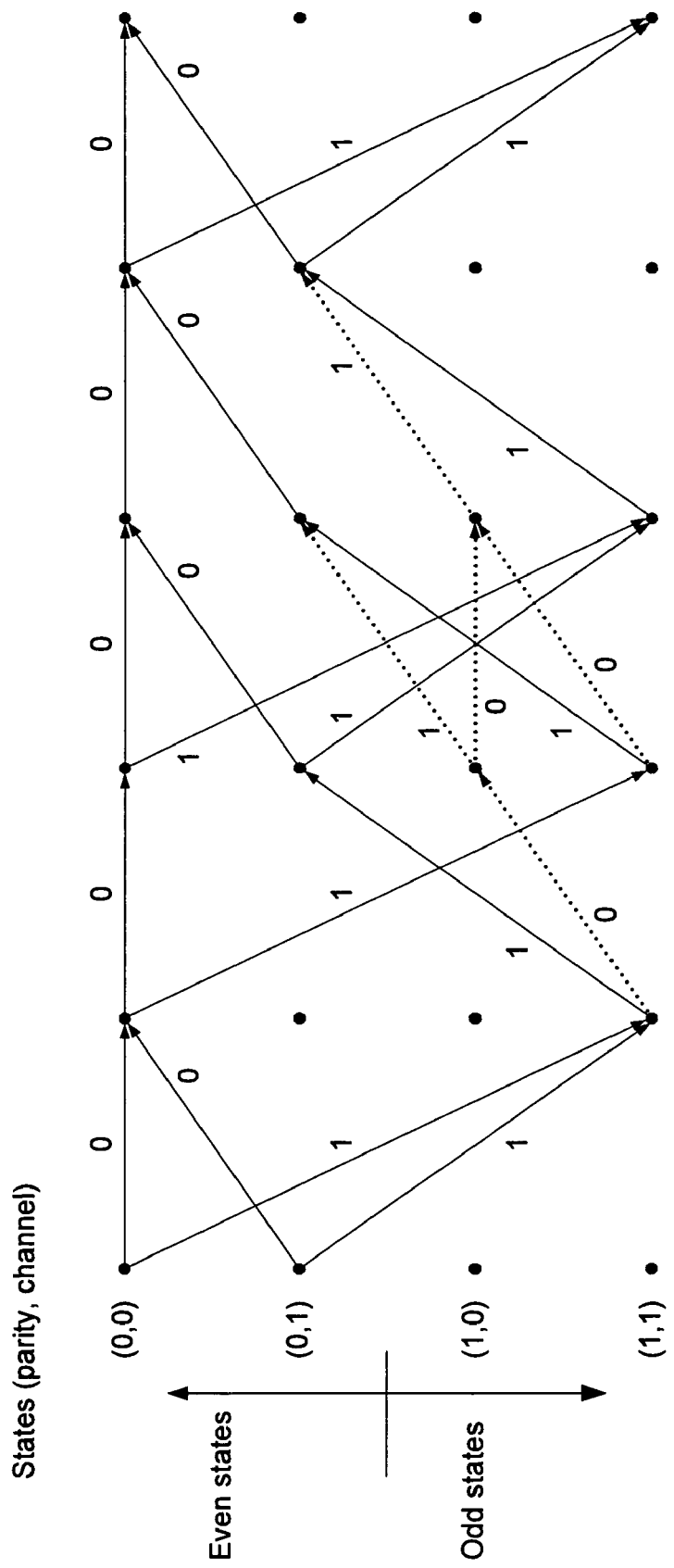

FIG. 4A shows a trellis diagram 30 for a rate 3/4, even parity code (N=3). Trellis 30 assumes that the channel (e.g., an ISI channel) has a memory length of 1. The branches of trellis diagram 30 are labeled by the input bit value. After the fourth bit, the trellis begins to repeat itself. FIG. 4B is essentially the same as FIG. 4A, except certain branches of the trellis diagram 30' have been "trimmed" (deleted) because the d+1 coding constraint has disallowed certain states (shown by the dotted-line arrows). It is apparent to those skilled in the art that other types of codes (e.g., other than single parity codes) can be used to increase the minimum pulse difference between valid sequences, which in turn decreases the probability of inadvertently mistaking one sequence for another. Such codes include, but are not limited to, BCH codes, Reed-Solomon codes, convolutional codes, and other linear/non-linear block codes.

The present invention focuses on increasing the separation between data transitions in storage media, preferably using existing technology to do so. One can assign a parameter, α, for measuring the separation between data transitions and define it as follows:

$$\alpha = D_{min}/T \tag{1}$$

where $D_{min}$ is the minimum distance in the storage medium between data transitions (e.g., 0→1→0 transitions 22 and 24 as shown in FIG. 1). In conventional symbol-based coding systems using a (0, G/I) code, α is generally about 1.

The present approach to increasing system capacity involves increasing the number of bits transmitted per data transition period T without decreasing α. More specifically, the present invention involves use of a signaling interval T/L, where L is the number of bits transmitted during data transition period T. When using a run length-limited (RLL) code (e.g., a conventional (d,k) convolutional code) in the present T/L system, the minimum transition separation period is (d+1)*(T/L). To increase the number of bits transmitted per data transition period T to more than 1 while keeping a then α≧1, then d+1 and one of the following conditions must be satisfied:

$$r/(T/L) \geq 1/T \quad (2)$$

or:

$$r \geq 1/L \quad (3)$$

where r is the transmission ratio (i.e., the number of information bits that can be transmitted per channel bit; in an RLL code, this is sometimes known as the capacity). Thus, as long as the transmission ratio (or capacity of an RLL code) is at least the same as the inverse of the number of bits read or transmitted per data transition period T, the data transition separation a and the data transmission bandwidth can be increased. This is generally achievable in modern data storage systems. Such a system can be implemented generally by multiplying the transmitter clock (in storage systems, the clock in the write head) by a factor of L.

However, because the data transition interval T is a fundamental limit to the properties of the recording medium, one still cannot physically write data such that data transitions occur closer than the minimum data transition spacing T. In other words, one cannot code data in a T/2 system such that three successive bits change state (i.e., 010 and 101 sequences are disallowed). As a result, when a (d,k) code is used in the present invention, d≧1. Such codes may be advantageously employed in NRZ- and NRZI-based coding systems.

In one example, using parameters from a commercially available data storage system, the code is a conventional (d,k) RLL code where d=1, k=10, and the capacity (or transmission ratio) is 0.6909 (about 0.7). In such an exemplary system, if one wishes to use a signaling interval (i.e., a channel bit length) of T/2, then L=2, and one can write or transmit about (2*0.7), or about 1.4, bits in the same transition separation period T that conventional T-based systems write or transmit 1 bit. Alternatively, one can lengthen T by a factor of about 1.4 and maintain the same recording density (i.e., the minimum transition separation can be increased by about 40% without a density penalty).

However, if one takes a conventional approach to processing information read from a conventional storage medium at a signaling interval of T/2, then the sampling frequency in the demodulator must double, resulting in a larger analog bandwidth in the read back electronics, more noise, greater intersymbol interference (e.g., between the bit being read from the medium and adjacent and/or recently-read bits), etc. Doubling the sampling frequency would also double the number of taps in the detector, which would (in theory) double the square of the number of branches in the detector trellis. The amount of processing logic that would be needed to decode the data and determine the most likely sequence could be overwhelming in certain cases. For example, in an exemplary system having a signaling interval of T and employing 5 taps, the number of states in a conventional Viterbi decoder processing the data in the taps would be $2^{(5-1)}=16$. Doubling the number of taps to 10 would increase the theoretical number of states in the Viterbi decoder to $2^{(10-1)}=512$, double the square of the number of states in the conventional Viterbi decoder. Also, it may not be desirable or feasible to double the clock speed in the receiver (e.g., the read head in a magnetic recording system).

However, one can sample the data from the channel at the same conventional rate (i.e., once every T units of time). In certain cases, this may be referred to as "baud rate sampling." Baud rate sampling is advantageous in the present invention when employing a RLL code, which may limit the actual signal spectrum to one that is similar to or compatible with a conventional 1/T signaling system.

To process the increased number of bits transmitted or read during period of time T (generally, from 1 to L), one increases the number of states in the detector logic of the receiver. For example, in the T/2 system described above, one could employ the same number of taps (e.g., 5, 1 for input and 4 for the tail; i.e., a memory length of 4T), and sample the read data once every period of time T (the data transition interval). A symbol received in the input tap can then represent the 2 data bits read or transmitted from the storage channel, and a 2-bit decoder would convert the symbol into one of four possible binary (digital) states: 11, 10, 01, or 00. The Viterbi detector would then have a maximum of 4 branches from each preceding state in the trellis, instead of the conventional 2 states, but the reduced number of taps would reduce the number of theoretically possible states in the Viterbi detector to $4^{(5-1)}$=256, a reduction of 50% (to a first approximation).

The actual number of possible states in the Viterbi detector will generally be less than the number of theoretically possible states, as coding requirements will generally disallow certain branches of the trellis. In some cases, such as magnetic recording channels, the actual number of possible states in the Viterbi detector can be less than 50% of the number of theoretically possible states. In the present invention, disallowing branches of the Viterbi detector trellis that would violate one or more coding constraints leads to an even further reduction in the actual number of possible states relative to the number of theoretically possible states in a conventional system. This benefit has a surprising impact on reducing the size of the memory in the Viterbi detector logic (e.g., a most likely sequence calculator), which may be implemented as a look-up table and which may contain calculating logic having (i) a complexity proportional to and (ii) a calculating speed inversely proportional to the size of the most likely sequence calculator memory.

FIG. 5 shows various diagrams and waveforms useful for explaining the present method with reference to the above example. A magnetic recording channel (not shown) may have data recorded thereon or therein as a magnetic moment having one of two arbitrary but oppositely polarized directions, indicated by arrows 40-47. Alternatively, the storage channel may comprise an optically recorded data channel or a CD-ROM, in which case the data bit may have an optical data parameter (such as reflectance or transmittance) corresponding to one of two states. The data (e.g., magnetic moments 40-47) may be read from the channel at an effective rate of two bits per tap interval T (corresponding to the conventional minimum period of time between transitions in the recorded data). For example, a storage channel read head may output waveform 50 in response to reading the recorded data (e.g., bits 40-47). However, in contrast to conventional technology, transitions (e.g., 52 and 54) in waveform 50 can occur between data transition intervals (i.e., at times n*[T/L], where n is an integer that is not an integer multiple of L). The period of time T/L may be measured in ns, hundreds of ps, or even tens of ps.

In a further aspect, the present method relates to reading data from a channel, and generally comprises (a) receiving K units of serial data at an effective rate of L bits per data transition period; (b) determining a binary value for each of the K serial data units once per data transition period; and (c) determining a most likely value for a K*L-bit binary sequence corresponding to the K serial data units. This method is particularly applicable to reading data from a storage channel (e.g., magnetic recording media).

In a broader sense, however, the present invention is generally applicable to any system configured to transmit (e.g., write) and receive (e.g., read) L bits of data per data transition interval T (a "T/L" system), as long as (i) the coding capacity (i.e., the largest possible ratio of codable data sequences to theoretically possible data sequences) is at least the same as the inverse of L, and (ii) the data waveform does not transition within a time period of less than the minimum transition interval T (e.g., $d+1 \geq L$ for a RLL code). For example, in a T/5 system, $d \geq 4$, which would mean that $k \geq 7$ (the capacity of a (4,7) RLL code is 0.3142, and the capacity of all RLL codes increases as k increases). In such a system, the number of theoretically possible states in the "most likely sequence" logic would be quite high ($2^{20}$, assuming there are 5 taps in the receiver). However, a great number of branches in the detection logic would be disallowed, greatly reducing the amount of memory needed for the "most likely sequence" logic. For example, any state in which a 5-bit unit has more than one transition is disallowed by the code constraints, which by itself reduces the number of possible states per tap from 32 to 10 and the size of the MLS memory from more than a million states to a maximum of 10,000. Furthermore, the transmitted symbols may also be greatly simplified. Rather than being 32-ary, one can represent the allowed states for the 5-bit units with simple decimal numbers (e.g., the Arabic numbers from 0 to 9).

Figure 6B:
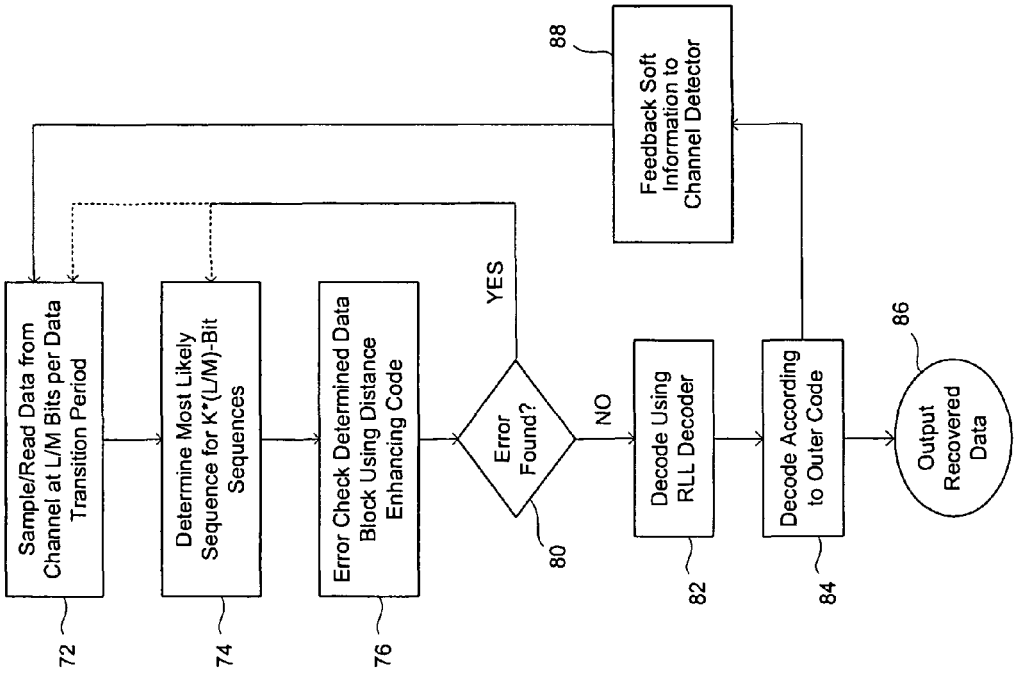
FIGS. 6A-B are flow charts for exemplary encoding and decoding processes according to the present invention, respectively.
Figure 6A:
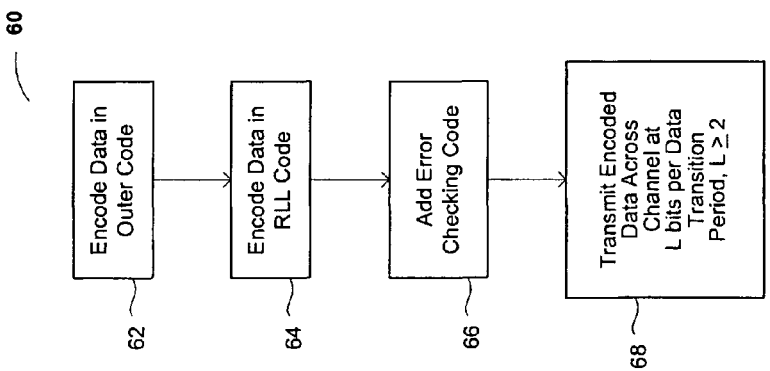

FIG. 6A shows an exemplary encoding process flow 60 according to the present invention. In a first (and optional) step 62, the data to be transmitted to the channel (e.g., a magnetic recording medium) is encoded in accordance with an error correcting outer code. Suitable outer codes include product codes, block codes, such as Golay codes, Reed-Solomon (R-S) codes and Bose-Chaudhuri-Hocquenghem (BCH) codes, and convolutional codes, such as dual-k codes. Next, in step 64, the outer code-encoded data is then encoded according to a run length limited (RLL) code or other inner code. Generally, the inner code comprises a RLL code. Finally, the outer- and inner-encoded data has error checking (and/or correction) code added thereto in step 66. As explained herein, the error checking code generally comprises a single parity code, which generally adds a single parity bit to the end of a block of code or data having a predetermined length according to a known parity-generating algorithm and/or logic. After the data has been completely encoded, in step 68, it is transmitted to (or across) the channel at a rate of L bits per data transition period, where L is as defined herein (generally as integer $\geq 2$).

FIG. 6B shows an exemplary decoding process flow 70 according to the present invention. In a first step 72, the data is read and/or sampled from the channel (e.g., a magnetic recording medium) at a rate of L/M bits per data transition period, where L and M are as defined herein (generally L is an integer $\geq 2$, M is an integer $\geq 1$, and $M \geq L$). Next, in step 74, a most likely sequence is determined (generally by Viterbi decoding) for K*(L/M)-bit sequences of the sampled/read data, where K is the number of taps in the sequence detector. Generally, K is an integer $\geq 2$, and in one implementation, K=5. In step 76, the sequence-detected data is error checked according to the known error-checking algorithm(s) and/or logic corresponding to the error-checking code added in the corresponding encoding process. In decision block 80, if an error is found, the sequence detection step 74 may be repeated, or alternatively, an error signal may be sent to the transmitter (or read head) to send (or read) the data again (e.g., step 72 may be repeated). If no error is identified, the sequence-detected data is inner code-decoded in step 82 according to the run length limited (RLL) code or other inner code used in the corresponding encoding process. Thereafter, the inner code-decoded data is (optionally) decoded in accordance with the error correcting outer code used in the corresponding encoding process (assuming the corresponding encoding process used an outer code). Finally, the data recovered from the decoding process 84 is output, and optionally, soft information (such as reliability information) may be fed back to the channel detector for use in sampling/channel decoding received data, determining a most likely data sequence, etc.

Exemplary Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm. In one implementation, the present decoding method/algorithm is executed by firmware (which comprises a type of software) programmed into a micro-processor located in a receiver.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a signal processor, a microprocessor, microcontroller, or logic circuit such as a programmable gate array, programmable logic circuit/device or application-specific [integrated] circuit).

In various implementations, the channel comprises a storage channel (which may further comprise a magnetic storage medium). In various embodiments, the computer-readable medium or waveform comprises at least one instruction to (i) NRZ or NRZI encode the serial data prior to writing the serial data to the channel; (ii) NRZ or NRZI decode the serial data (generally after receiving the same from the channel); (iii) channel encode the serial data prior to writing the serial data to the channel; (iv) channel decode the serial data (which may already be NRZ or NRZI decoded); (v) interleave the serial data; (vi) deinterleave the serial data (generally after receiving and channel decoding the same); (vii) look up a binary value corresponding to each of the recorded data units (e.g., by retrieving the binary value from an address in a look-up table, where the address corresponds to a symbol representing the [recorded] data unit); and/or (viii) calculate a most likely K*L-bit binary sequence according to a Viterbi algorithm. Generally, the channel code comprises a run length-limited code (e.g., a (d,k) code in which d+1≧L). In one implementation, each of the received serial data units comprises a symbol having a number of possible states sufficient to represent all allowed L-bit binary sequences of the serial data.

An Exemplary Circuit and/or Viterbi Detector Architecture

In one aspect, the present invention relates to a circuit, comprising (a) circuitry configured to receive a serial stream of m-ary symbols, (b) logic configured to convert the m-ary symbols to corresponding n-ary data, and (c) detector logic configured to (i) calculate a most likely sequence for the n-ary data from L-unit blocks thereof, and (ii) disallow subsequent L-unit blocks in which (1) there is a transition within the L unit block and (2) any of the first x units of the subsequent L-unit block do not equal any of the last y units in an immediately preceding L-unit block, where x and y are each an integer of at least 1 and x+y=L. Generally, m is an integer of at least 2, 2≦n≦m, L is an integer of at least 2, and (consistent with the above-described method) successive transitions in the n-ary data are not closer than L units apart. Typically, n and L are each 2 (i.e., the L-unit blocks consist of 2 bits of binary data), in which case L-unit blocks in which there is a transition and a first unit $s_i$ does not equal a last unit in the immediately preceding L-unit block are disallowed. In one embodiment, the detector logic comprises a Viterbi detector. In another embodiment, the detector logic comprises an m-ary to n-ary decoder.

Thus, present circuit may comprise a means for receiving a serial stream of m-ary symbols, a means for converting the m-ary symbols to corresponding n-ary data, where successive transitions in the n-ary data are not closer than L units apart, and one or more means for (i) calculating a most likely sequence for the n-ary data from L-unit blocks thereof and (ii) disallowing subsequent L-unit blocks in which (1) there is a transition within the L unit block and (2) any of a first x units of the subsequent L-unit block do not equal any of a last y units in an immediately preceding L-unit block, where m, n, L, x and y are as defined herein.

Figure 7:
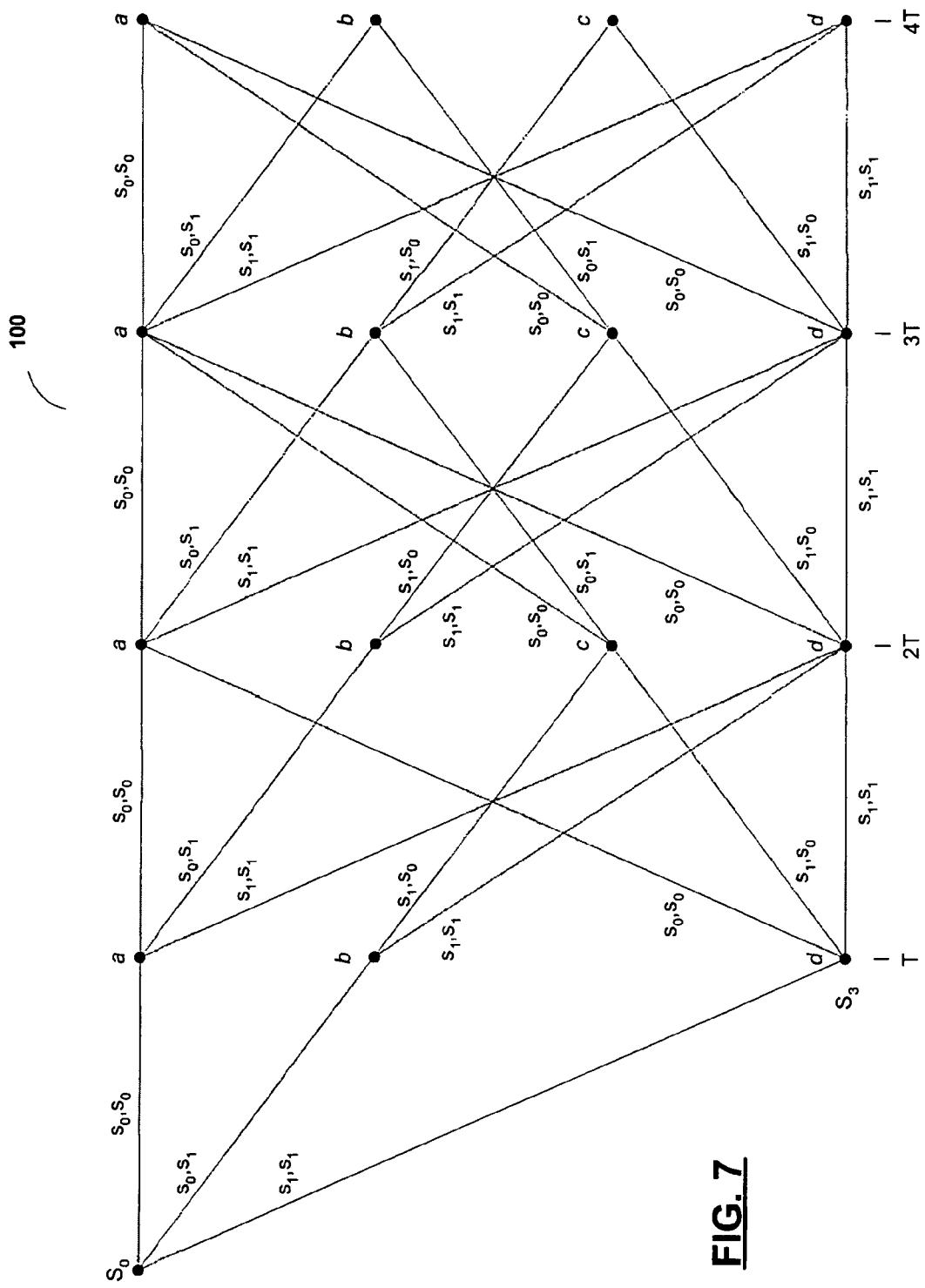
FIG. 7 is a trellis diagram of a preferred implementation of the present detector.

FIG. 7 shows a trellis 100 for an exemplary embodiment of a Viterbi detector according to the present invention. Thus, in the present circuit, a means for calculating and disallowing may comprise a means for conducting a Viterbi algorithm, and the n-ary data processed by the present circuit generally comprises a run length limited (RLL) code (e.g., the (d,k) code described above). The Viterbi detector exemplified by the trellis 100 is configured to determine a most likely sequence for a (d,k) NRZ code where d=1 and L=2 (i.e., where d+1≧L), as described above for an exemplary embodiment of the present method). Thus, the exemplary Viterbi detector may process 2-bit blocks of binary code in which transitions are at least 2 bit lengths apart. As a result, if there is a transition within a give 2-bit block, the first bit $s_i$ of that block must equal a last bit $s_{i-1}$ in the immediately preceding block.

Initially, the Viterbi detector has a state $S_0$ (i.e., an allowed state for the first 2-bit block of data received therein). In this case, state $S_0$ must be one in which the 2 bits have the same value (i.e., $[s_0,s_0]$, which may be equal to either [1,1] or [0,0]), since a (d,k) NRZ code where d=1 cannot have a transition within the first 2 bits of received data. After a first data interval T, a second 2-bit block of binary data is received, and the Viterbi detector may have one of three states (a, b or d), depending on the value of the received 2-bit binary data block. The trellis 100 contains a node a for data having the same value as at state $S_0$ (i.e., $[s_0,s_0]$), a node d for data having the complementary value as at state $S_0$ (i.e., $[s_1,s_1]$), and a node b for data having a transition and in which the first bit has the same value as the last bit at state $S_0$ (i.e., $[s_0,s_1]$). At time T, the trellis 100 does not have a node c for data having a transition and in which the first bit has a different (e.g., complementary) value as the last bit at state $S_0$ (i.e., $[s_1,s_0]$), because this state is disallowed under the (d,k) NRZ coding constraints. If the Viterbi detector receives data having a transition and in which the first bit has a different (e.g., complementary) value as the last bit at state $S_0$, a sequence error may be indicated (e.g., by the detector logic, or by other logic, such as error detection and indication logic, elsewhere in the receiver).

After a second data interval 2T, a third 2-bit block of binary data is received, and the Viterbi detector may have one of four states (a, b, c or d), depending on the value of the received 2-bit binary data block. The trellis 100 contains a node a for data having the same value as that at node a in the preceding stage (i.e., $[s_0,s_0]$), complementary nodes b and c for data having a transition and in which the first bit has the same value as the last bit in the preceding stage (i.e., $[s_0,s_1]$ and $[s_1,s_0]$, respectively), and a node d for data having the same value as that at node d in the preceding stage (i.e., $[s_1,s_1]$). While all four of the possible nodes for 2-bit binary data are present in the trellis 100 at time 2T, only certain paths are allowed. For example, the trellis 100 allows paths from node a at time T to nodes a, b and d at time 2T, but not to node c because that path is disallowed under the (d,k) NRZ coding constraints. Similarly, the trellis 100 allows only the path to node b at time 2T from node a at time T, because the paths from nodes b and d are disallowed under the (d,k) NRZ coding constraints. Out of the 12 theoretically possible paths from nodes a, b and d at time T to nodes a, b, c and d at time 2T, only 8 are allowed, thereby simplifying the trellis 100 relative to the theoretical maximum. If the Viterbi detector receives data corresponding to a disallowed path in the trellis 100, a sequence error may be indicated as discussed above. Thus, the detector logic in the present circuit may be further configured to disallow paths or states that violate a coding constraint in the received data.

After a third data interval 3T, a fourth 2-bit block of binary data is received, and the Viterbi detector may have one of same four states as at time 2T (a, b, c or d), depending on the value of the received 2-bit binary data block. As in the preceding stage (i.e., T→2T), only certain paths are allowed in the trellis 100. For example, the same 8 allowed paths in the second stage are allowed in the third stage, but two additional paths from node c to nodes a and b are allowed because node c has a transition and nodes a and b have a first bit with the same value as the last bit at node c in the preceding stage. Thus, out of the 16 theoretically possible paths from nodes a-d at time 2T to nodes a-d at time 3T, only 10 are allowed, further simplifying the trellis 100 relative to the theoretical maximum number of paths. As discussed above, if the Viterbi detector receives data corresponding to a disallowed path in the trellis 100, a sequence error may be indicated.

After a fourth data interval 4T, a fifth 2-bit block of binary data is received, and the Viterbi detector may have one of same four states as at time 2T (a, b, c or d), depending on the value of the received 2-bit binary data block. Also, the same paths are allowed as in the preceding stage in the trellis 100. Consequently, the trellis 100 has reached the steady state at time 3T, where (6/16)=37.5% of the theoretical maximum number of paths are disallowed. In contrast, none of the paths are disallowed in a corresponding trellis for the conventional case where L=1. In a five-stage detector (i.e., a detector having five taps), the exemplary scheme reduces the number of allowed states to less than 50% of the theoretical maximum. This may be generally true for (d,k), NRZ/NRZI code (where d≧1) processed by detector logic having at least 5 taps.

The code for which the exemplary Viterbi detector may determine the most likely sequence may comply with other constraints and/or coding parameters. For example, in conventional (d,k) code, there is typically a constraint on the maximum number of consecutive bits having the same state or value. Also, many codes are configured to encode an average signal value or power that centers on a predetermined value (e.g., 0). As a result, the detector logic may be further configured to calculate a metric associated with each allowed state in each of a plurality of the L-unit blocks, and/or the present circuit may further comprise weighting logic configured to assign a weighting factor with each of the metrics based on one or more coding parameters and/or constraints. Consequently, in a further embodiment, the present circuit may further comprise a storage circuit configured to store (at least temporarily) the metric and/or weighting factor associated with each of a plurality of L-unit data blocks (e.g., stages in the Viterbi detector) or with a most likely sequence of the plurality of the L-unit blocks. It is well within the abilities of one skilled in the art to design and use such logic.

Thus, in the present circuit, the means for calculating and disallowing may further comprise a means for calculating a metric associated with each allowed state in each of a plurality of the L-unit blocks. The circuit itself may further comprise a means for weighting each of the metrics based on one or more coding parameters and/or constraints, and optionally, a means for storing (at least temporarily) at least the metric associated with the most likely sequence of the L-unit blocks.

In various other embodiments, the present circuit may further comprise (i) error detection logic configured to indicate detection of a transmission error when a disallowed state is detected in the n-ary data; (ii) a deinterleaver (e.g., configured to deinterleave interleaved code); (iii) a plurality of taps (as described above) and/or (iv) a decoder configured to disallow states that violate a (further) coding constraint (e.g., a means for disallowing states that violate a coding constraint). In various implementations, the error detection logic comprises conventional error checking and/or correction circuitry (generally configured to detect and/or indicate one or more errors in the data output from the detection logic), the deinterleaver is configured to receive the data output from the detection logic, and/or the circuit includes 5 taps (1 for the input [i.e., to determine the present state of the received data], and 4 for the tail).

As is known in the art, information signals transmitted over a channel (not necessarily limited to conventional storage channels) are generally analog, and may comprise m-ary data or m-ary symbols representing multi-bit binary data. Thus, the present circuit may further comprise sampling logic (a "sampler") configured to (i) sample an analog waveform from the channel and (ii) provide a serial stream of m-ary symbols from the analog waveform. In various implementations, the sampler may be further configured to sample the analog waveform once per data transition period. Furthermore, the circuit may further comprise a clock configured to provide a timing signal to the sampler, the timing signal having a period approximately equal to the data transition period T (or a frequency of about 1/T). In magnetic data retrieval applications, such a clock may be termed a "read" clock because it is associated with the function of reading data from a magnetic recording medium.

Thus, the present circuit may further comprise a means for serially receiving each of a plurality of the L-unit blocks of n-ary data, a means for (i) sampling an analog waveform from a channel and (ii) providing the serial stream of m-ary symbols from the analog waveform, and/or a means for providing a timing signal to the means for sampling, where L, m and n are as defined herein and the timing signal has a period equal to the data transition period divided by M. The means for sampling and providing may sample the analog waveform M times (e.g., once) per data transition period, where M is as defined herein.

An Exemplary Receiver and Storage System

In a further aspect of the invention, the present invention relates to a receiver, comprising the present circuit and receiver logic communicatively coupled to the circuit, configured to (i) receive an analog waveform from a channel and (ii) provide the serial stream of m-ary symbols from the analog waveform. Thus, the present receiver may comprise the present circuit and a means for (i) receiving an analog waveform from a channel and (ii) providing the serial stream of m-ary symbols from the analog waveform. The receiver may be in nearly any communications system employing a convolutional code or channel with memory (ISI channels) and noise, such as storage networks, magnetic and optical data storage systems, wireless networks, metropolitan and wide area telephone networks using wireline and/or fiber optic communication channels, Ethernet and token-ring networks, television and radio transmissions, satellite transmissions, etc. In one embodiment, the receiver is embodied on a single integrated circuit.

Of course, the integrated circuit may contain other functional circuit blocks. For example, the present receiver may further comprise (i) output circuitry configured to output a most likely sequence of the n-ary data (e.g., from the Viterbi detector) and/or (ii) error checking and/or correction circuitry in communication with the detector logic. Thus, the receiver may further comprise a means for outputting the most likely sequence of the n-ary data.

The present invention also relates more specifically to a system for reading data from a storage channel, comprising the present receiver and at least one storage device configured to store one of the n-ary data or the m-ary symbols. Generally, the storage device(s) are communicatively coupled (directly or indirectly) to the receiver. Thus, the system may comprise the present receiver and at least one means for storing one of the n-ary data or the m-ary symbols, the at least one means for storing being communicatively coupled to the receiver.

An exemplary system 120 using a distance enhanced code (e.g., single parity coding) and a corresponding decoder 130 are shown in FIG. 8A. The system 120 generally comprises channel encoder 140 (comprising outer encoder 142, RLL encoder 150, distance enhancing encoder 160, recording medium (channel) 170, and detector 130. Outer code encoder 142, RLL encoder 150, and distance enhancing encoder 160 are largely conventional, except for the data transmitter clock operating at a rate higher than 1/T (e.g., [L/M]*[1/T]).

An optimal detection circuit 130 would have a maximum a posteriori (MAP) detector that may be configured to decode the recording channel, a RLL code (e.g., encoded by RLL encoder 150), a distance enhancing code (e.g., encoded by distance enhancing encoder 160), and the outer code (e.g., encoded by outer encoder 142). The MAP detector 130 can be implemented using the so-called BCJR algorithm ("Optimal Decoding of Linear Codes for Minimizing Symbol Error Rate," Bahl, L. et al., IEEE Trans. Information Theory, vol. 20, iss. 2 (March 1974), pp. 284-287, the relevant portions of which are incorporated herein by reference). Alternatively, if there is no a priori information about the user data (e.g., bitstream DATA), a maximum likelihood (ML) detector may be used to perform essentially the same decoding/sequence detection function(s) as the MAP detector. A ML detector is usually implemented in the form of Viterbi detector. A ML detector may also be employed if user data (e.g., DATA) comprises an independently identically distributed sequence. The outer code may comprise a R-S code, a BCH code, a product code, etc., and the distance enhancing code may comprise a single parity code, a BCH code, a LDPC code, a Turbo code, etc.

A sub-optimal implementation 120' of the present circuit is shown in FIG. 8B. The MAP (or ML) detector may be separated into two functional circuit blocks, a first detector 130' that has a trellis corresponding to the channel, the distance enhancing code and the RLL code, and a decoder 132 corresponding to the outer code. Such concatenated decoding is generally considered sub-optimal. However, reliability information (soft information) can be passed from the decoder 132 to the detector 130' along feedback path 135. Iterating between the detector 130' and the decoder 132 can approach MAP (or ML) detector performance ("Near Shannon Limit Error-Correcting Coding and Decoding: Turbo-codes. 1," Berrou, C. et al., IEEE International Conference on Communications, 1993 (ICC 93, Geneva); Technical Program, Conference Record, Vol. 2; 23-26 May 1993, pp. 1064-1070).

Referring back to FIG. 4A, an exemplary trellis for detector is shown for a single parity code with N=3 and channel memory=1 (i.e., the channel response has two taps). The trellis incorporates the single parity code constraint with the ISI channel. The channel trellis is trimmed (i.e., invalid branches are taken out), in part due to the single parity code and in part in accordance with the coding constraint(s). FIG. 4B shows the detector trellis for a similar single parity code system, in which N=3 and the channel memory=1, using a (1,k) RLL code. The trellis of FIG. 4B has fewer valid branches than the trellis of FIG. 4A, demonstrating that RLL encoding generally trims the trellis even more than optimal coding as shown in FIG. 4A.

Figure 8C:
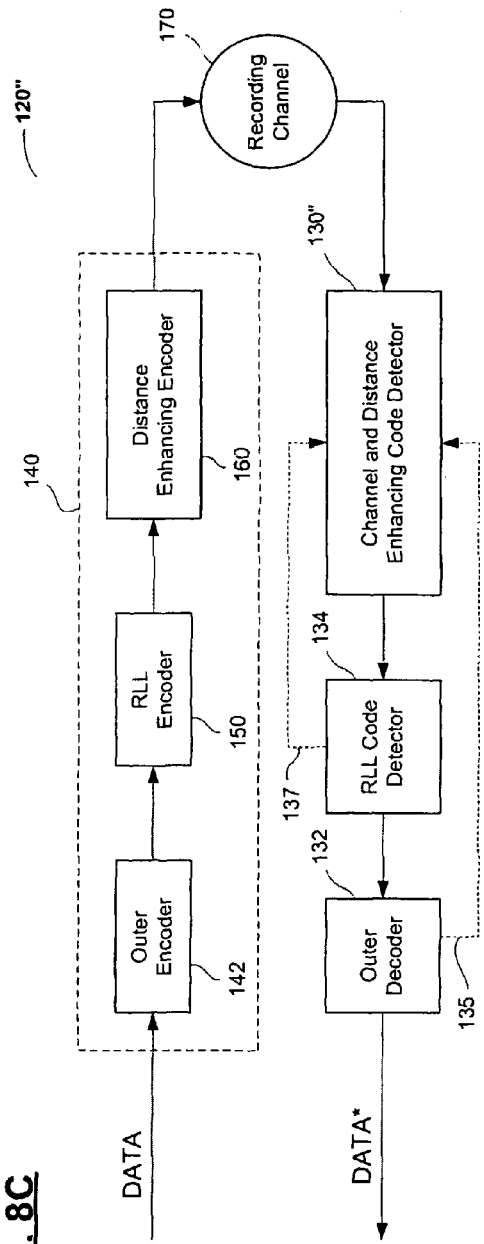

FIG. 8C shows another sub-optimal coding system implementation 120" having three MAP (or ML) detectors, a channel and distance enhancing code detector 130", a RLL decoder 134, and outer code decoder 132. Reliability information (soft information) can be passed to distance enhancing code detector 130" from RLL detector 134 (along feedback path 137) and/or from outer decoder 132 (along feedback path 135) in an iterative fashion to approach MAP (or ML) performance.

Figure 8D:
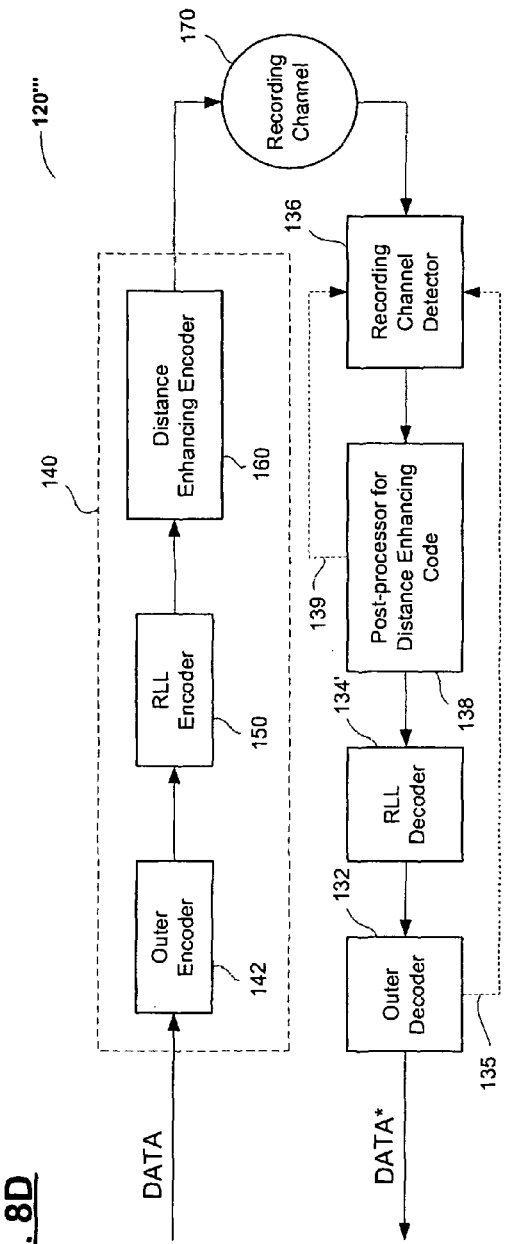

FIG. 8D shows a "detector+post-processor" architecture 120'''. In this architecture, a simple channel detector (Viterbi type, DFE, etc.) 136 can make a rough estimate of the data input to the recording channel 170. Then, a post-processor 138 may be configured to correct errors in this rough estimate by taking other code and/or channel constraints (e.g., from the distance-enhancing code and/or RLL code) into account. In fact, each of the distance-enhancing code decoder (e.g., detector 130" in FIG. 8C), RLL decoder 134' (FIG. 8D), and outer code decoder 132 can be implemented as a post-processor, and one or more of the decoders can be combined with the channel detector 136 and/or other post-processor (not shown). In one option, post-processor 138 provides information (such as reliability information) to channel detector 136 via feedback path 139.

Figure 8E:
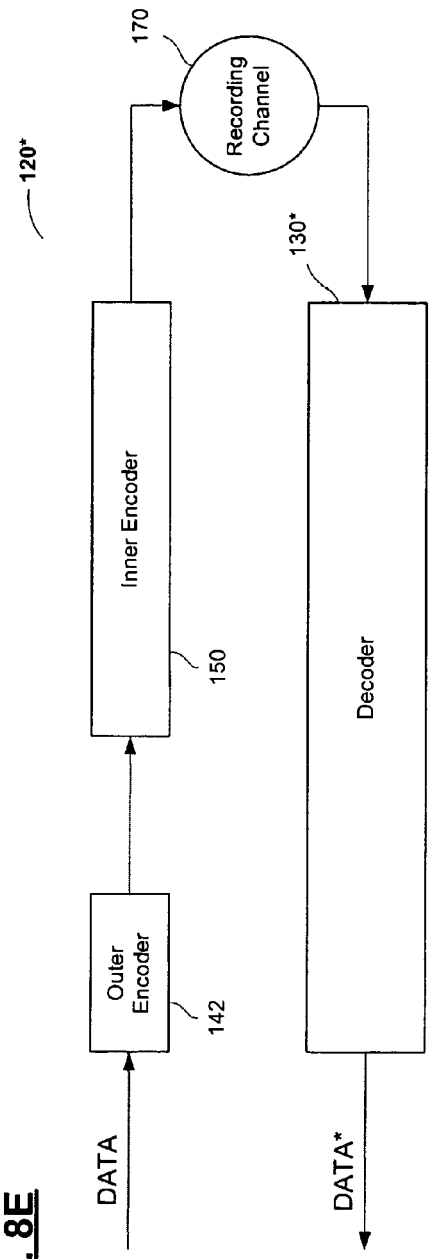

On the encoder side, FIG. 8E shows that the RLL and distance-enhancing encoders can be combined into a single inner encoder 150. For example, a single parity encoder can be easily combined with a RLL encoder. It is also possible to combine all encoders (e.g., outer code, RLL code, and parity) into one encoder 140, as shown generally throughout FIGS. 8A-8D. The combined encoder adds the RLL (or other, possibly convolutional) constraints, distance enhancement (e.g., parity or other error checking code), and error correction capabilities to the user data stream DATA before writing them to the recording medium 170. This can be done with a circuit that combines the functions of the outer code encoder, the RLL encoder, and the distance-enhancing encoder. Alternatively, one can design a code that has the desired properties integrated therein (e.g., RLL or convolutional constraints, distance enhancement function, and error correction capabilities). For example, LDPC codes can be designed that achieve such a code integration goal.

Figure 9:
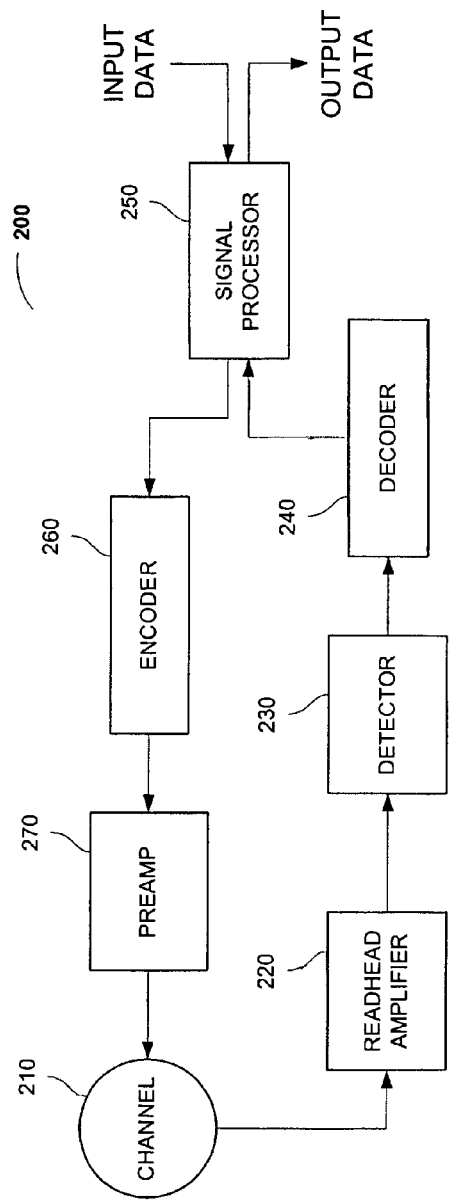
FIG. 9 is a block-level diagram showing an exemplary storage system embodying the present invention.

FIG. 9 shows an exemplary magnetic storage system 200, including storage channel 210, amplifier 220, detector logic 230, decoder 240, signal processor 250, encoder 260 and amplifier 270. Generally, storage channel 210 comprises a magnetic disk drive, and detector 230 is exemplified by the exemplary circuit described above. Thus, in one implementation, the system further comprises a read head configured to receive an analog waveform (representing the recorded data) from the storage channel, and provide the serial stream of m-ary symbols from the analog waveform to the detector logic. The read head is substantially similar to those conventionally used for magnetic or optical data storage systems (e.g., a magnetic hard drive or CD-ROM). Typically, the read head comprises sampling logic and a read clock (such as that described above with regard to the present circuit).

The present system may further comprise a decoder 240 (which may or may not be on the same IC as amplifier 220, the sampling logic and read clock, and/or detector 230), configured to decode the n-ary data from detector logic 230, and/or signal processor 250, configured to process the decoded n-ary data. As shown in FIG. 9, signal processor 250 may process both (i) data input to the storage system 200 (i.e., to be recorded in storage channel 210) and (ii) data output from storage system 200 (i.e., read from storage channel 210).

Encoder 260 and write amplifier 270 are largely conventional, and perform functions conventionally associated with such circuit blocks. For example, encoder 260 may comprise a conventional encoder (e.g., a RLL, (d,k) and/or NRZ/NRZI encoder configured to encode data according to coding constraints associated with such codes), alone or in combination with a convolutional encoder (generally positioned upstream from the conventional [e.g., RLL] encoder). Write amplifier 270 may be included in a conventional write head for a magnetic or optical data storage system (e.g., a magnetic hard drive or CD-ROM), and therefore, includes output circuitry and/or other data writing hardware present in conventional write heads.

Thus, the present system may further comprise a means for reading the analog waveform, configured to provide the serial stream of m-ary symbols from the analog waveform; a means for decoding the n-ary data; a means for processing the decoded n-ary data; a means for writing an encoded waveform to a means for storing; a means for providing a timing signal to the means for writing, the timing signal having a period equal to the data transition period divided by L; a means for encoding the encoded waveform from data to be recorded in the means for storing; and/or a means for providing the data to be recorded to the means for encoding.

CONCLUSION/SUMMARY

Thus, the present invention provides a method, algorithm, software, circuit, receiver, and system for increasing bandwidth and/or transition separation in channels using RLL codes. In one aspect, the present method comprises writing serial data to a channel at a rate of at least 2 bits per data transition period, wherein successive transitions in the serial data are not closer than 1 data transition period apart; reading each of at least 2 units of recorded data from the channel once per data transition period; and determining a most likely value for a K*L-bit binary sequence corresponding to the recorded data units read during the data transition period. In another aspect, the method comprises (a) receiving K units of serial data at an effective rate of L bits per data transition period; (b) determining a binary value for each of the K serial data units once per data transition period; and (c) determining a most likely value for a K*L-bit binary sequence corresponding to the K serial data units. This method is particularly applicable to reading data from a storage channel (e.g., magnetic recording media).

The circuit generally receives m-ary symbols, converts them to n-ary data, and includes detector logic that (i) calculates a most likely n-ary data sequence from L-unit blocks thereof, and (ii) disallows subsequent L-unit blocks in which there is a transition and any of the first x units do not equal any of the last y units in an immediately preceding block (where x and y are each integers of at least 1 and where x+y=L). Generally, successive transitions in the serial data are at least L bit lengths apart. The algorithm(s) and software generally implement the method, and the receivers and systems generally include the circuit. By using certain coding techniques and increasing the transmitter/write clock frequency, bandwidth and/or minimum transition separation in RLL encoded data can be increased dramatically, without a proportional increase in the complexity of the most likely sequence detector logic (e.g., a Viterbi detector).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of transmitting serial data through a channel, the method comprising:
using an encoder, writing serial data to said channel at a rate of L bits per data transition period, wherein L is an integer of at least 2, said data transition period defines a minimum separation for transitions in said serial data, and successive transitions in said serial data are not closer than L bit lengths apart;
using a detector, reading each of K data units from said channel M times per data transition period, where M and K are each an integer of at least 1, M is less than L, and each of said K data units contains $2^{(L-M)}$ data bits; and
using a decoder, determining a most likely value for a $K*2^{(L-M)}$-bit binary sequence corresponding to said K data units.

2. The method of claim 1, wherein said serial data comprises a run length-limited code.

3. The method of claim 2, wherein said run length-limited code comprises a (d,k) code in which d+1≧L and d is an integer of at least 3.

4. The method of claim 1, wherein each of said K data units comprises a symbol having a number of possible states sufficient to represent all allowed $2^{(L-M)}$-bit binary sequences of said serial data, and the method further comprises determining a binary value for each of said K data units.

5. The method of claim 1, further comprising NRZ or NRZI encoding said serial data prior to writing said serial data to said channel.

6. The method of claim 1, wherein determining said most likely value comprises Viterbi detecting said $K*2^{(L-M)}$-bit binary sequence.

7. The method of claim 1, wherein said channel comprises a storage channel.

8. A non-transitory computer-readable medium comprising a computer-executable set of instructions adapted to perform the method of claim 1.

9. The medium of claim 8, comprising at least one instruction adapted to NRZ or NRZI encode said serial data prior to writing said serial data to a storage channel.

10. The medium of claim 8, wherein said serial data comprises a run length-limited code.

11. The medium of claim 10, wherein said run length-limited code comprises a (d,k) code in which d+1≧L and d is an integer of at least 3.

12. The medium of claim 8, comprising at least one instruction adapted to calculate the most likely $K*2^{(L-M)}$-bit binary sequence according to a Viterbi algorithm.

13. The medium of claim 12, wherein each of said serial data units comprises a symbol having a number of possible states sufficient to represent all allowed $2^{(L-M)}$-bit binary sequences of said serial data.

14. A method of processing serial data, the method comprising:
receiving K units of said serial data in a decoder at an effective rate of L bits per data transition period, each of said serial data units representing $2^{(L-M)}$ bits, wherein said data transition period defines a minimum separation for transitions in said serial data, K and M are each independently an integer of at least 1, L is an integer of at least 2, and M is less than L;
determining, using said decoder, an input L-bit value for each of said K serial data units M times per data transition period; and
determining, using said decoder, a most likely value for a $K*2^{(L-M)}$-bit binary sequence corresponding to said K serial data units.

15. The method of claim 14, wherein said serial data comprises a run length-limited code.

16. The method of claim 15, wherein said run length-limited code comprises a (d,k) code in which d+1≧L and d is an integer of at least 3.

17. The method of claim 14, wherein each of said serial data units comprises a symbol having a number of possible states sufficient to represent all allowed $2^{(L-M)}$-bit binary sequences of said serial data, and the step of determining said input L-bit value comprises decoding said symbols.

18. The method of claim 14, wherein determining said most likely value comprises Viterbi detecting said $K*2^{(L-M)}$-bit binary sequence.

19. The method of claim 14, comprising receiving said serial data from a storage channel.

20. A non-transitory computer-readable medium comprising a computer-executable set of instructions adapted to perform the method of claim 14.

21. The medium of claim 20, wherein said serial data comprises a run length-limited code.

22. The medium of claim 21, wherein said run length-limited code comprises a (d,k) code in which d+1≧L and d is an integer of at least 3.

23. The medium of claim 20, comprising at least one instruction adapted to calculate the most likely $K*2^{(L-M)}$-bit binary sequence according to a Viterbi algorithm.

24. The medium of claim 23, wherein each of said serial data units comprises a symbol having a number of possible states sufficient to represent all allowed $2^{(L-M)}$-bit binary sequences of said serial data.

25. A circuit, comprising:
circuitry configured to receive a serial stream of m-ary symbols, m being an integer of at least 2;
logic configured to convert said m-ary symbols to corresponding n-ary data, where $2 \leq n \leq m$, and successive transitions in said n-ary data are not closer than L data units apart, said L data units defining a minimum separation for transitions in said n-ary data, and L being an integer of at least 2; and
detector logic configured to (i) detect blocks of the L data units from said n-ary data M times per data transition period, where M is an integer of at least 1, and M is less than L, (ii) calculate a most likely sequence for said n-ary data from said L-data unit blocks and (iii) disallow a subsequent L-data unit block in which there is a transition within an immediately preceding one of said L-data blocks and any of a first x data units of said subsequent L-data unit block do not equal any of a last y data units in said immediately preceding L-data unit block, where x and y are each an integer of at least 1 and x+y=L.

26. The circuit of claim 25, wherein said detector logic comprises a Viterbi detector.

27. The circuit of claim 25, further comprising a decoder configured to disallow states that violate a coding constraint.

28. The circuit of claim 27, wherein said n-ary data comprises a run length-limited code.

29. The circuit of claim 28, wherein said run length-limited code comprises a (d,k) code in which d is an integer of at least 3.

30. The circuit of claim 25, wherein said detector logic is further configured to calculate a metric associated with each allowed state in each of a plurality of said L-unit blocks.

31. The circuit of claim 30, further comprising a storage circuit configured to store, at least temporarily, at least said metric associated with a most likely sequence of said plurality of said L-unit blocks.

32. The circuit of claim 30, further comprising weighting logic configured to assign a weighting factor with each of said metrics based on one or more coding parameters or constraints.

33. The circuit of claim 25, further comprising a plurality of taps.

34. The circuit of claim 25, further comprising a sampler configured to sample an analog waveform from a channel and provide said serial stream of m-ary symbols from said analog waveform.

35. The circuit of claim 34, wherein said sampler is further configured to sample said analog waveform once per data transition period.

36. The circuit of claim 34, further comprising a clock configured to provide a timing signal to said sampler, said timing signal having a period equal to said data transition period.

37. A receiver, comprising:
the circuit of claim 25; and
receiver logic communicatively coupled to said circuit, configured to receive an analog waveform from a channel and provide said serial stream of the m-ary symbols from said analog waveform.

38. The receiver of claim 37, embodied on a single integrated circuit.

39. A system for reading data from a storage channel, the system comprising:
the receiver of claim 37; and
at least one storage device configured to store one of said n-ary data or said m-ary symbols, said at least one storage device being communicatively coupled to said receiver.

40. The system of claim 39, further comprising a signal processor configured to process said decoded n-ary data.

41. The system of claim 39, further comprising a write head configured to transmit an encoded waveform to said storage channel.

42. The system of claim 41, further comprising a write clock configured to provide a timing signal to said write head, said timing signal having a period equal to said data transition period divided by L.

43. A system for transmitting serial data through a channel, the system comprising:
an encoder configured to encode serial data for transmission to said channel at a rate of L bits per data transition period, wherein L is an integer of at least 2, said data transition period defines a minimum separation for transitions in said serial data, and successive transitions in said serial data are not closer than L bit lengths apart;
a detector configured to receive K data units from said channel M times per data transition period, wherein M and K are each an integer of at least 1, M is less than L, and each of said K data units contains $2^{(L-M)}$ data bits; and
a decoder configured to determine a most likely value for a $K*2^{(L-M)}$-bit binary sequence corresponding to said K data units.

44. The system of claim 43, wherein said serial data comprises a run length-limited code.

45. The system of claim 44, wherein said run length-limited code comprises a (d,k) code in which $d+1 \geq L$ and d is an integer of at least 3.

46. The system of claim 43, wherein each of said K data units comprises a symbol having a number of possible states sufficient to represent all allowed $2^{(L-M)}$-bit binary sequences of said serial data.

47. The system of claim 43, wherein said encoder is configured to NRZ or NRZI encode said serial data.

48. The system of claim 43, wherein said decoder comprises a Viterbi detector.

49. The system of claim 43, wherein said channel comprises a storage channel.

* * * * *